US008803656B2

(12) United States Patent
Tamezane et al.

(10) Patent No.: US 8,803,656 B2
(45) Date of Patent: Aug. 12, 2014

(54) CARD-TYPE ELECTRONIC KEY

(75) Inventors: Takumi Tamezane, Aichi (JP); Toshiharu Katagiri, Aichi (JP); Noriyasu Shamoto, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 719 days.

(21) Appl. No.: 12/392,339

(22) Filed: Feb. 25, 2009

(65) Prior Publication Data

US 2009/0212903 A1 Aug. 27, 2009

(30) Foreign Application Priority Data

Feb. 26, 2008 (JP) ................................. 2008-045155

(51) Int. Cl.

| | |
|---|---|
| ***G05B 19/00*** | (2006.01) |
| ***G06F 7/00*** | (2006.01) |
| ***G06K 19/00*** | (2006.01) |
| ***G08B 29/00*** | (2006.01) |
| ***H04B 1/00*** | (2006.01) |

(52) U.S. Cl.

USPC .......... 340/5.2; 340/5.62; 340/5.72; 340/10.2

(58) Field of Classification Search

CPC ......... G05B 19/00; E05B 27/06; E05B 55/04; G06K 19/00; B60R 25/00

USPC ............... 340/5.62, 5.72, 5.2, 10.2; 307/10.2, 307/10.5; 70/252, 352, 395; 428/40.1; 40/306, 310

See application file for complete search history.

(56) References Cited

U.S. PATENT DOCUMENTS

| | | | | | |
|---|---|---|---|---|---|
| 2,552,699 | A | * | 5/1951 | Warfield | 206/37.1 |
| 3,927,543 | A | * | 12/1975 | Anastasov | 70/395 |
| 4,149,394 | A | * | 4/1979 | Sornes | 70/352 |
| 4,287,737 | A | * | 9/1981 | Ahn | 70/467 |
| 4,519,228 | A | * | 5/1985 | Sornes | 70/276 |
| 4,637,236 | A | * | 1/1987 | Almblad | 70/458 |
| 4,762,227 | A | * | 8/1988 | Patterson | 206/320 |
| 4,797,542 | A | * | 1/1989 | Hara | 235/380 |
| 4,860,562 | A | * | 8/1989 | Koren et al. | 70/352 |
| 4,936,123 | A | * | 6/1990 | Matsuda | 70/456 R |
| 5,561,331 | A | * | 10/1996 | Suyama et al. | 307/10.3 |

(Continued)

FOREIGN PATENT DOCUMENTS

| | | |
|---|---|---|
| JP | 2-114295 | 6/1992 |
| JP | 08-022526 | 1/1996 |

(Continued)

OTHER PUBLICATIONS

Office Action, dated Feb. 28, 2012, issued in corresponding Japanese Application No. 2008-045155 (in Japanese only).

*Primary Examiner* — Nam V Nguyen

(74) *Attorney, Agent, or Firm* — Saul Ewing LLP

(57) ABSTRACT

A card-type electronic key having a high level of portability and including an emergency mechanical key that is difficult to duplicate. The electronic key is used with a communication controller arranged in a vehicle. The electronic key includes a communication circuit unit which transmits a wireless signal including an authentication code. The communication circuit unit is allowed to control an external device arranged on the subject when the communication controller receiving the wireless signal determines that the verification code is authentic. A key card unit includes a verification code pattern formed by through holes. A concealment film is removably adhered to the key card unit and conceals the through holes so that the through holes cannot be seen.

11 Claims, 8 Drawing Sheets

(56) References Cited

U.S. PATENT DOCUMENTS

| | | | | |
|---|---|---|---|---|
| 5,801,614 | A * | 9/1998 | Kokubu | 340/425.5 |
| 6,383,592 | B1 | 5/2002 | Lowry et al. | |
| 6,400,254 | B2 * | 6/2002 | Yamamoto et al. | 340/5.6 |
| 6,572,015 | B1 * | 6/2003 | Norton | 235/382 |
| 6,691,539 | B2 * | 2/2004 | Jacob et al. | 70/408 |
| 6,705,531 | B1 * | 3/2004 | Norton | 235/492 |
| 6,770,345 | B2 * | 8/2004 | Sellars | 428/40.1 |
| 6,776,016 | B1 * | 8/2004 | Wittwer et al. | 70/252 |
| 6,803,675 | B2 * | 10/2004 | Harada et al. | 307/10.3 |
| 6,840,455 | B2 * | 1/2005 | Norton | 235/492 |
| 7,227,446 | B2 * | 6/2007 | Kumazaki et al. | 340/5.61 |
| 7,227,447 | B2 * | 6/2007 | Ohtaki et al. | 340/5.62 |
| 7,375,440 | B2 * | 5/2008 | Suyama et al. | 307/10.2 |
| 7,422,146 | B2 * | 9/2008 | Dennett | 235/380 |
| 7,581,422 | B2 * | 9/2009 | Schindler | 70/252 |
| 7,793,528 | B2 * | 9/2010 | Maples | 70/352 |
| 7,954,347 | B2 * | 6/2011 | Tamezane et al. | 70/352 |
| 7,956,741 | B2 * | 6/2011 | Tamezane et al. | 340/542 |
| 8,413,473 | B2 * | 4/2013 | Tamezane et al. | 70/352 |
| 2001/0011942 | A1 * | 8/2001 | Yamamoto et al. | 340/5.65 |

FOREIGN PATENT DOCUMENTS

| | | |
|---|---|---|
| JP | 2001-020572 | 1/2001 |
| JP | U3090369 | 9/2002 |
| JP | 2004-311730 | 11/2004 |
| JP | 2007-142886 | 6/2007 |

* cited by examiner

CARD-TYPE ELECTRONIC KEY

CROSS-REFERENCE TO RELATED APPLICATIONS

This application is based upon and claims the benefit of priority from prior Japanese Patent Application No. 2008-045155, filed on Feb. 26, 2008, the entire contents of which are incorporated herein by reference.

BACKGROUND ART

The present invention relates to a card-type electronic key, and more particularly, to a card-type electronic key including a verification code pattern, which is formed by through holes or recesses, and a concealment film, which conceals the verification code pattern.

For a vehicle (subject) such as an automobile, there is a demand for a higher level of security (safety) and improved convenience for the vehicle user. An electronic key system of the prior art includes a portable electronic key, which is held by the user, and a communication controller, which is arranged in a vehicle. In the electronic key system bidirectional wireless communication is performed between the portable electronic key and the communication controller. When ID verification is established through wireless communication, the doors are allowed to be locked and unlocked, and the engine is allowed to be started (refer to, for example, Japanese Laid-Open Patent Publication No. 2007-142886).

The user of the electronic key system may automatically control an on-vehicle device without the need for performing a manual operation with a mechanical key. Further, the security level of the vehicle is improved since the establishment of electromagnetic ID verification is a requirement for enabling vehicle control.

An electronic key is normally driven by a battery. However, under an abnormal or emergency situation such as when the battery of the electronic key or the battery of the vehicle becomes drained, the electronic key system of the prior art cannot perform electromagnetic ID verification. For this reason, an electronic key includes an emergency mechanical key. The emergency mechanical key is inserted into a lock, which is arranged on the vehicle, so that the lock performs mechanical ID verification with the mechanical key. When this ID verification is established, the control of an on-vehicle device (external device), which is arranged on the vehicle, is enabled.

Nowadays, there is a demand for card-type electronic keys. A card-type electronic key may be held in a wallet or a card case in the same manner as a credit card or a driver's license and has a high level of portablility.

Emergency mechanical keys for card-type electronic keys have been proposed in the prior art (refer to, for example, Utility Model Registration No. 3090369). For example, as shown in FIG. 8, a card-type key 100 includes a card key 101 and a case 102. The card key 101 functions as a mechanical key and includes a verification code pattern formed by a plurality of through holes 101*a*. Further, the card key 101 is pivotal about a pivot pin 103 to be movable into and out of the case 102.

SUMMARY OF THE INVENTION

However, the through holes 101*a* forming the verification code pattern of the card key 101 may be seen by a third person. The card key 101 is typically formed from a flexible or soft resin, and the through holes 101*a* are thus easy to form.

Accordingly, if a third person obtains an electronic key including the card key 101, the third person would easily be able to duplicate the verification code pattern (through holes 101*a*). As a result, for example, the third person may enter the vehicle and use the vehicle in an unauthorized manner without the user noticing.

The present invention provides a card-type electronic key having a high level of portability and including an emergency mechanical key that is difficult to duplicate in an unauthorized manner.

One aspect of the present invention is a card-type electronic key for use with a communication controller arranged in a subject remote from the card-type electronic key. The card-type electronic key includes a communication circuit unit which transmits a wireless signal including an authentication code. The communication circuit unit is allowed to control an external device arranged on the subject when the communication controller receiving the wireless signal determines that the verification code is authentic. A key card unit forms an integral card with the communication circuit unit and includes a verification code pattern formed by a plurality of through holes or a plurality of recesses extending in a thickness-wise direction of the integral card. A concealment film is removably adhered to the key card unit and conceals the plurality of through holes or the plurality of recesses so that the through holes or recesses cannot be seen.

In one embodiment, the concealment film includes a non-adhesive region which eases removal of the concealment film from the key card unit.

In one embodiment, the concealment seal has an adhesive capability set so that once the concealment film is removed from the key card unit, the concealment film cannot be adhered to the key card unit again.

In one embodiment, the concealment film includes an outer surface on which a primary aesthetic surface is formable by printing a character, a symbol, a line, or a graphical design; and the key card unit includes an outer surface on which a secondary aesthetic surface is formable by printing a character, a symbol, a line, or a graphical design.

In one embodiment, the key card unit includes a notch which eases removal of the concealment film from the key card unit.

In one embodiment, the concealment film is formed from a material having a brittleness that is adjusted to leave a removal trace when the concealment seal is removed from the key card unit.

In one embodiment, the concealment film is a non-conductive body.

In one embodiment, the integral card includes corners; and the non-adhesive region is defined by a corner of the concealment film arranged at a location separated from the corners of the integral card.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2(*b*) is a partially cutaway plan view showing the electronic key of FIG. 2(*a*);

FIG. 2(*c*) is a cross-sectional view taken along line 2*c*-2*c* in FIG. 2(*a*);

FIG. 5(*b*) is a perspective view showing a third modification of the electronic key;

FIG. 6(*b*) is a cross-sectional view showing a fourth modification of the card-type electronic key (α is an enlarged view showing an end);

FIG. 6(*c*) is a cross-sectional view showing a fifth modification of the card-type electronic key (β is an enlarged view showing an end):

FIG. 7(*b*) is a cross-sectional view showing the electronic key of FIG. 7(*a*) taken along line 7*b*-7*b* (γ1 and γ2 are enlarged views showing the left and right ends)

DETAILED DESCRIPTION OF THE PREFERRED EMBODIMENTS

A preferred embodiment of the present invention will hereafter be discussed.

Figure 1:
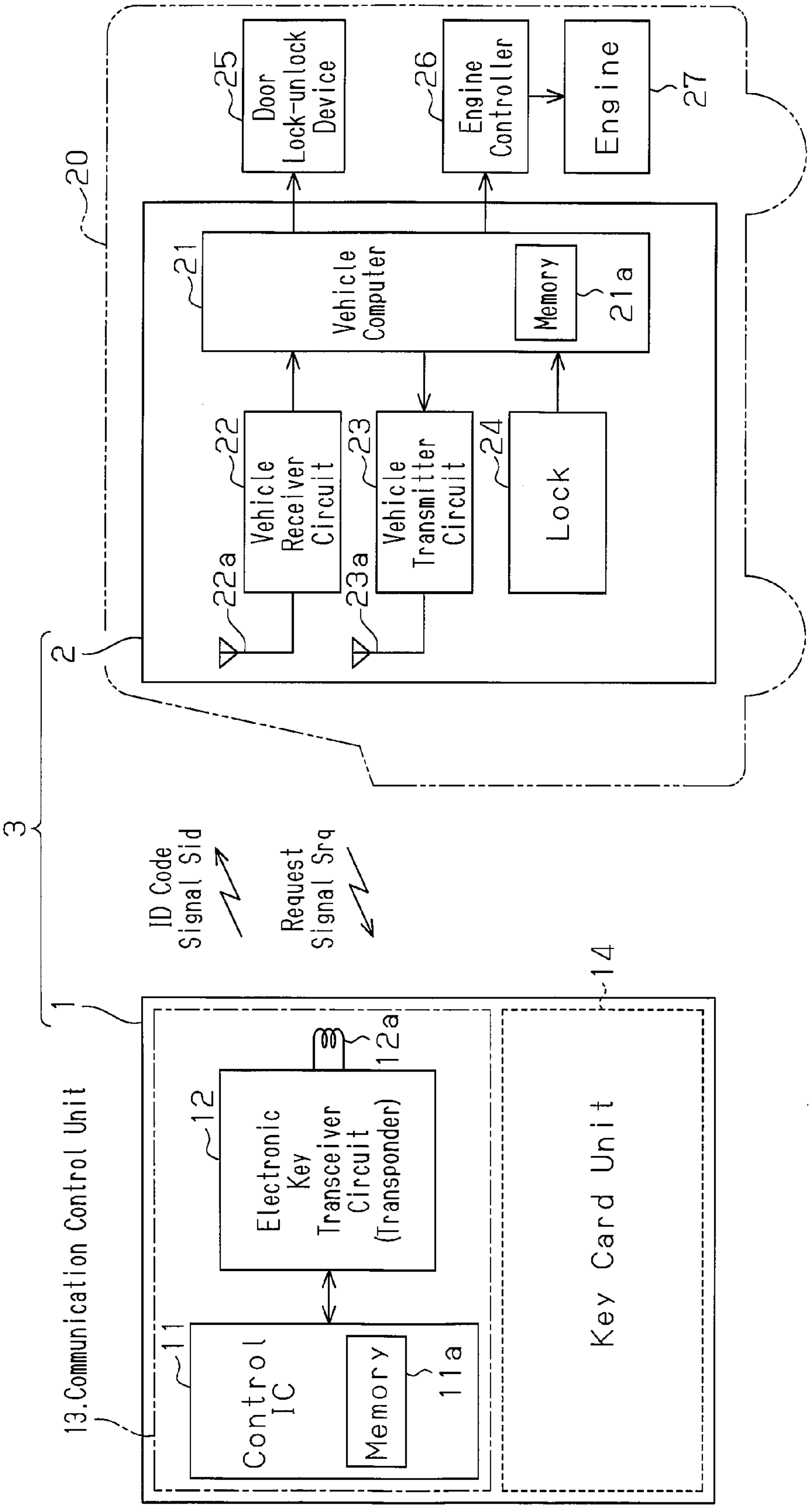
FIG. 1 is a block diagram of an electronic key system.

FIG. 1 shows an electronic key system 3. The electronic key system 3 includes a card-type electronic key 1, which is held by a user of a vehicle 20 (four-wheel automobile), and a communication controller 2, which is arranged in the vehicle 20. In the electronic key system 3, bidirectional wireless communication is performed between the card-type electronic key 1 and the communication controller 2. When ID verification is established through wireless communication, the electronic key system 3 allows the doors to be locked and unlocked and the engine to be started.

The communication controller 2 is provided with a vehicle receiver circuit 22 including an antenna 22*a*, a vehicle transmitter circuit 23 including an antenna 23*a*, and a vehicle computer 21 including a memory 21*a*. The vehicle transmitter circuit 23 transmits through the antenna 23*a* a preset request signal Srq (wireless signal such as radio wave signal) to a transmission area formed outside the vehicle 20 and a further transmission area formed inside the vehicle 20. When the card-type key 1 is located in one of the transmission areas of the request signal Srq, the electronic key 1 sends back an ID code signal Sid (wireless signal such as radio wave signal) in response to the request signal Srq.

More specifically, the request signal Srq is received by a loop antenna 12*a* of an electronic key transceiver circuit 12. In response to the request signal Srq, an electronic key computer (control IC) 11 generates an ID code signal Sid (wireless signal such as radio wave signal), which includes an ID code stored in a memory 11*a*. The ID code signal is transmitted through the electronic key transceiver circuit 12 and the loop antenna 12*a* to the communication controller 2.

In the illustrated embodiment, the electronic key computer 11 and the electronic key transceiver circuit 12 (including the loop antenna 12*a*) serve as a communication circuit unit 13.

When the vehicle receiver circuit 22 receives the ID code signal Sid through the antenna 22*a*, the vehicle computer 21 compares an ID code stored in the memory 21*a* with the ID code included in the received ID code signal Sid. As long as the ID code transmitted from the electronic key 1 is authentic (for example, the compared ID codes are the same), ID authentication is established. In such a case, the communication controller 2 allows opening and closing of door locks with a door lock-unlock device 25 and allows an engine 27 to be started with an engine controller 26. The door lock-unlock device 25 and the engine controller 26 are examples of on-vehicle devices in the vehicle 20. In this manner, when the ID code transmitted from the electronic key 1 is authentic, the control of on-vehicle devices (external devices) in the vehicle is allowed.

In the example of FIG. 1, the electronic key transceiver circuit 12 may be supplied with power from a transponder power feed circuit (not shown), which is arranged in the vehicle 20, in a non-contact manner through electromagnetic coupling. That is, the electronic key transceiver circuit 12 is chargeable by electromagnetic coupling, which occurs when power is transmitted from the transponder power feed circuit, and implements a so-called transponder function.

The card-type electronic key 1 may include a battery (not shown). This battery or a battery of the vehicle 20 (on-vehicle-battery) may become drained. To cope with such an abnormal or emergency situation, the card-type electronic key 1 includes a key card unit 14, which functions as an emergency mechanical key. Under such a situation, the key card unit 14 is inserted into a lock 24, which is arranged on the vehicle 20 (e.g., on a door), to perform mechanical ID verification. When verification is established, the opening and closing of door locks with the door lock-unlock device 25 is allowed.

In this manner, under an abnormal or emergency situation, the functions of the electronic key 1 are backed up by the key card unit 14 and the transponder function of the transceiver circuit 12.

Figure 2A:
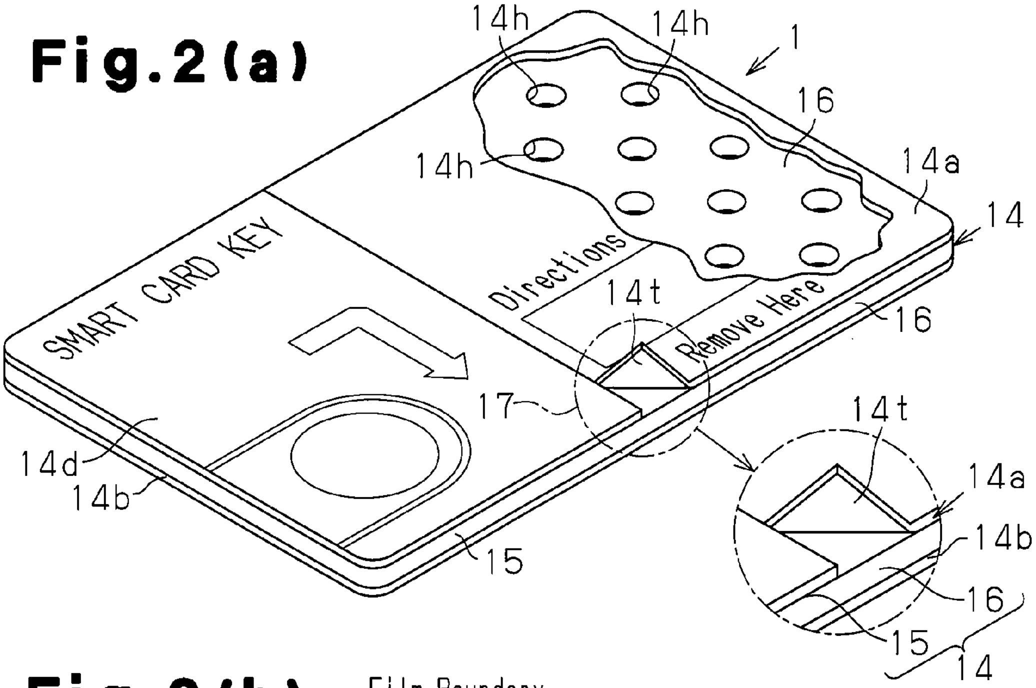
FIG. 2(*a*) is a perspective view showing a card-type electronic key according to a preferred embodiment of the present invention.
Figure 2B:
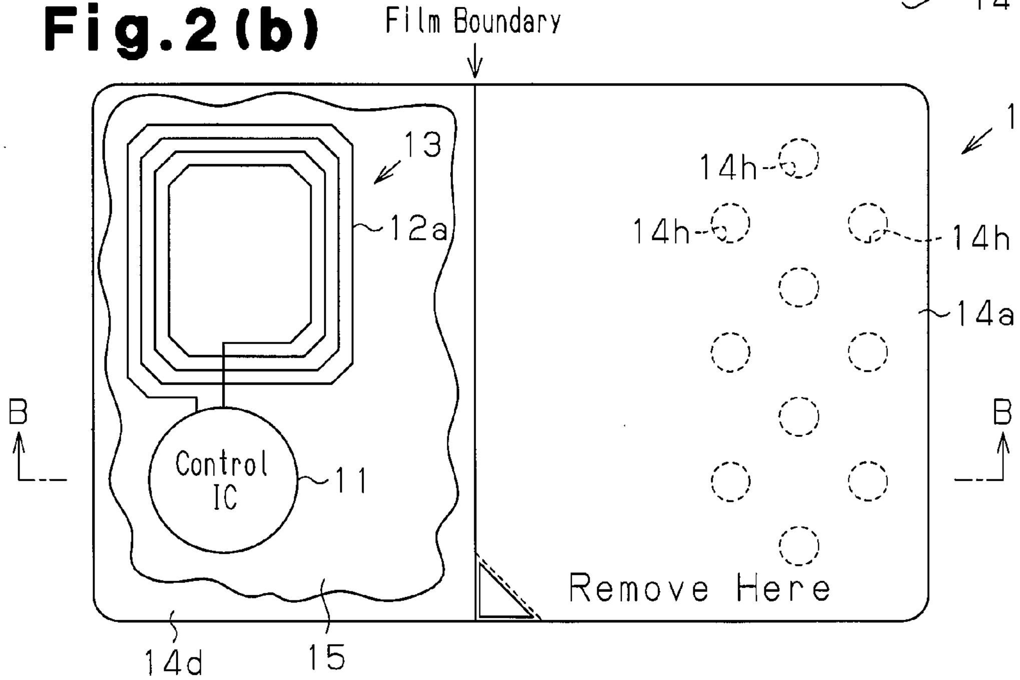
Figure 2C:
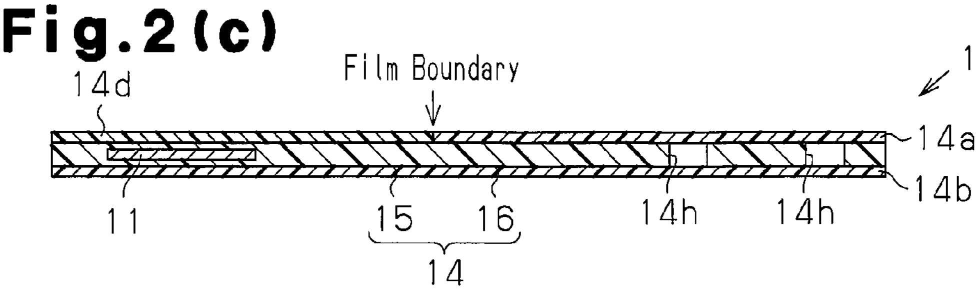

Referring to FIGS. 2(*a*) to 2(*c*), the key card unit 14 and the communication circuit unit 13 form an integral card. The integral card may be, for example, tetragonal (rectangular). The key card unit 14 includes a verification code pattern, which is formed by a plurality of through holes 14*h* extending in the thickness-wise direction.

The key card unit 14 may be formed from a flexible resin material, such as polypropylene, so that the key card unit 14 does not interfere with the wireless communication of the communication circuit unit 13 and so that the key card unit 14 is easy to handle. The key card unit 14 includes a first card region 15 and a second card region 16. The card regions 15 and 16 can be tetragonal. The communication circuit unit 13 (the electronic key computer 11 and the loop antenna 12*a*) is arranged in the first card region 15. For example, the communication circuit unit 13 (the electronic key computer 11 and the loop antenna 12*a*) may be retained in the first card region 15 or printed onto the first card region 15 in the same manner as a printed circuit board. The verification code pattern formed by through holes 14*h* is arranged in the second card region 16. In FIG. 2(*b*), the electronic key transceiver circuit 12 is hidden by the electronic key computer 11 and cannot be seen.

A concealment film 14*a* is removably adhered to the second card region 16 and conceals the through holes 14*h* so that the through holes 14*h* cannot be seen.

As long as the through holes 14*h* cannot be seen, the material forming the concealment film 14*a* is not limited. In the illustrated embodiment, the concealment film 14*a* is opaque. The concealment film 14*a* may be formed from, for example, paper or a non-conductive resin such as polyethylene resin so that it does not interfere with wireless communication. The concealment film 14*a* may be mirror finished.

Further, the concealment film 14*a* is formed to have substantially the same shape and area as the second card region 16. Thus, the concealment film 14*a* entirely covers the second card region 16. In the illustrated embodiment, all the through holes 14*h* forming the verification code pattern cannot been seen. The concealment film 14*a* may be referred to as a peel-off concealment label or a peel-off concealment sticker.

In the preferred embodiment, the concealment film 14*a* has an adhesive surface (inner surface) to which an adhesive agent is uniformly applied. It is preferred that once the concealment film 14*a* is removed from the key card 14, the concealment film 14*a* can no longer be adhered to the key card 14. In other words, it is preferred that the concealment film 14*a* have a weak adhesive capability.

Examples of adhesive agents that can be used include acrylic and solvent acrylic adhesive agents. As long as the concealment film 14*a* has a weak adhesive capability but can be adhered to the key card unit 14 in an ensured manner when the card-type electronic key 1 is manufactured, the adhesive agent is not limited. Further, the surface of the key card unit 14 may undergo a polyethylene lamination process so that the concealment film 14*a* can be removed only once.

As shown in FIGS. 2(*a*) to 2(*c*), to ease removal of the concealment film 14*a* from the second card region 16, the concealment film 14*a* may include a non-adhesive region 14*t*. When applying the adhesive agent to the inner surface of the concealment film 14*a*, the non-adhesive region 14*t* may easily be formed by leaving part of the inner surface free from the adhesive agent. The non-adhesive region 14*t* functions as a tab that can be easily held with fingers. The tab may be formed in one corner of the concealment film 14*a* by a bent triangular portion. The non-adhesive region 14*t* does not have to be adhered to the key card unit 14 to any extent. However, the non-adhesive region 14*t* may have an adhesive capability that is further weaker than the other parts of the concealment film 14*a* so that the non-adhesive region 14*t* is easier to remove that the other parts.

The use of the key card unit 14 will now be discussed.

Figure 3A:
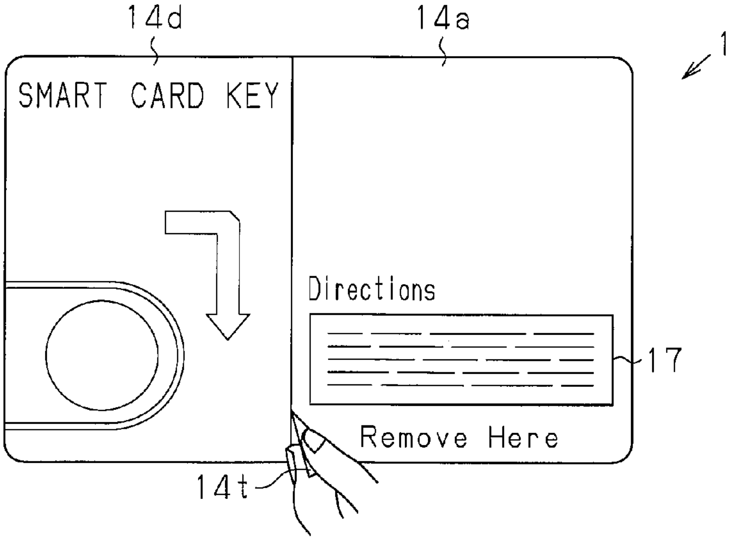
FIGS. 3(*a*) to 3(*c*) are plan views showing the procedures for removing a concealment seal from the electronic key of FIG. 2(*a*)
Figure 3B:
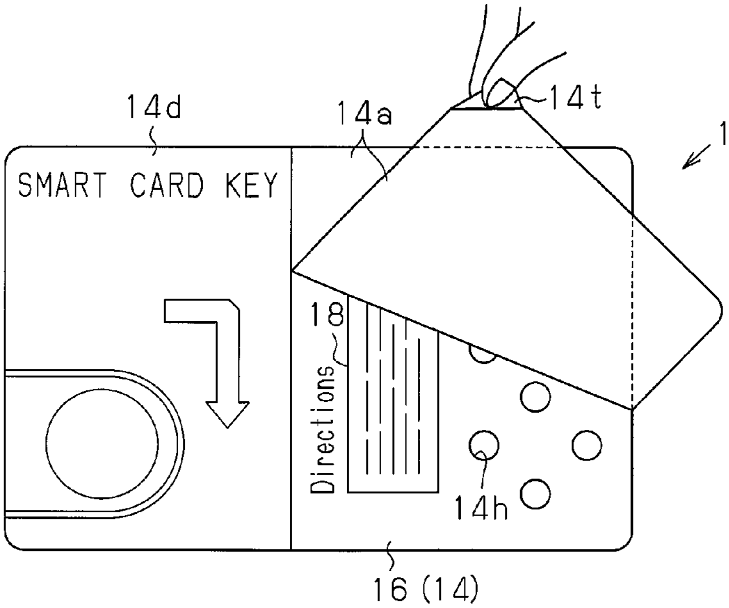
Figure 3C:
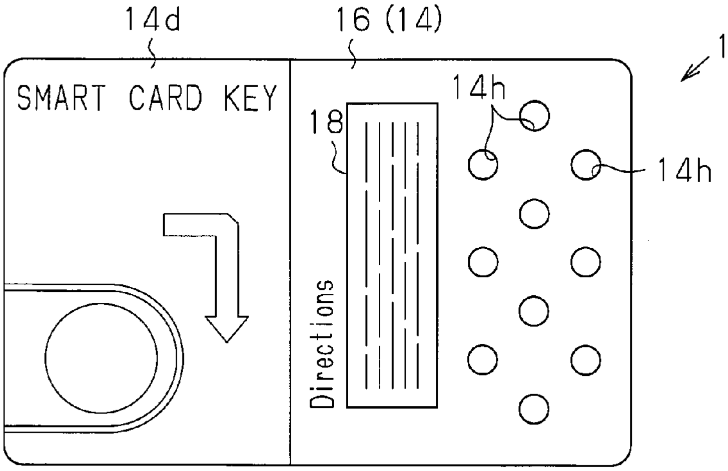

Referring to FIG. 3(*a*), the user of the vehicle 20 first holds the non-adhesive region 14*t* of the concealment film 14*a* with his or her fingers. Then, referring to FIG. 3(*b*), the user pulls the non-adhesive region 14*t* with his or her fingers to remove the concealment film 14*a* from the second card region 16 (FIG. 3(*c*)). This exposes the through holes 14*h* of the key card unit 14. The key card unit 14 is inserted into the lock 24 with the through holes 14*h* in the exposed state. When mechanical ID verification of the verification code pattern formed by the through holes 14*h* is established, the opening of the lock 24 is allowed. A plurality of movable pin tumblers (not shown) arranged at predetermined positions in the lock 24 cooperate with the through holes 14*h* of the verification code pattern when the key card unit 14 opens the lock 24.

Referring to FIGS. 2(*a*) to 2(*c*), the concealment film 14*a* has a surface (outer surface) onto which characters, symbols, lines, and graphical designs may be printed to form an aesthetic surface. In the example shown in FIG. 2(*a*), the concealment film 14*a* has an aesthetic surface onto which the words “REMOVE HERE” are printed. Instructions (directions) for using the card-type electronic key 1 or the manufacturer’s trademark or name may also be printed on the aesthetic surface. When necessary, the concealment film 14*a* may undergo a lamination process or ultraviolet (UV) treatment to form the aesthetic surface.

Referring to FIG. 3(*c*), the key card unit 14 may include a surface onto which characters, symbols, lines, and graphical designs may be printed to form an aesthetic surface. For example, instructions (directions) for using the key card unit 14 may be printed on the aesthetic surface. The printed information on this aesthetic surface remains concealed until the concealment film 14*a* is removed.

Referring to FIG. 2(*a*), a coating film 14*d*, which is formed from a polyester resin, is adhered to the surface of the first card region 15 with an adhesive agent to cover the communication circuit unit 13. The coating film 14*d* is formed to have substantially the same shape and area as the first card region 15. The coating film 14*d* may have a surface (outer surface) onto which characters such as “SMART CARD KEY”, symbols such as a bent arrow, and graphical designs are printed.

As shown in FIGS. 2(*a*) and 2(*c*), a protection film 14*b* may be adhered to the entire rear surface of the key card unit 14 with an adhesive agent. The illustrated protection film 14*b* is formed to have substantially the same shape and area as the key card unit 14 (the first card region 15 and second card region 16). The protection film 14*b* is, for example, a polyester resin film.

The card-type electronic key 1 has the advantages described below.

(1) The key card unit 14 includes the verification code, which is formed by the plurality of through holes 14*h*. The concealment film 14*a*, which conceals the through holes 14*h*, is removably adhered to the key card unit 14. This makes it difficult for the verification code pattern to be duplicated by a third person and improves the security level of the card-type electronic key 1. Further, in case an abnormality or emergency occurs, the through holes 14*h* may be exposed just by removing the concealment film 14*a* from the key card unit 14. Thus, the key card unit 14 can easily be used as a mechanical key. The key card unit 14 and the communication circuit unit 13 form an integral card. As a result, the electronic key 1 has an extremely high level of portability. For example, the electronic key 1 is thin and compact and therefore can easily be carried in a wallet or a card case. The verification code pattern, which is formed by the plurality of through holes 14*h*, is covered by the opaque concealment film 14*a*. This improves the aesthetic appeal of the electronic key 1.

(2) The concealment film 14*a* includes the non-adhesive region 14*t*, to which the adhesive agent is not applied. The non-adhesive region 14*t* enables the concealment film 14*a* to be easily held when removing the concealment film 14*a* from the key card unit 14.

(3) Once the concealment film 14*a* is removed from the key card unit 14, the adhesive capability of the key card unit 14 is such that it cannot be adhered again to the key card unit 14 (weak adhesive capability). Accordingly, unauthorized removal of the concealment film 14*a* by a third person (unauthorized usage history of the key card unit 14) can easily be determined by checking whether or not the concealment film 14*a* has been removed.

(4) Instructions (directions) on how to use the card-type electronic key 1 can be printed on the aesthetic surface of the concealment film 14*a*. Instructions (directions) on how to use the key card unit 14 as an emergency mechanical key is printed on the aesthetic surface of the key card unit 14. Thus, the concealment film 14*a* increases the level of security and improves convenience for the user of the electronic key 1.

It should be apparent to those skilled in the art that the present invention may be embodied in many other specific forms without departing from the spirit or scope of the invention. Particularly, it should be understood that the present invention may be embodied in the following forms.

Figure 4A:
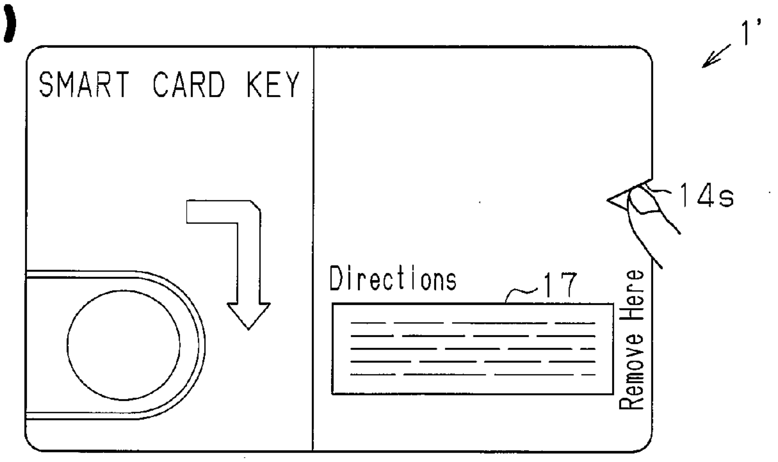
FIGS. 4(*a*) to 4(*c*) are plan views showing the procedures for removing a concealment seal from a first modification of the electronic key)
Figure 4B:
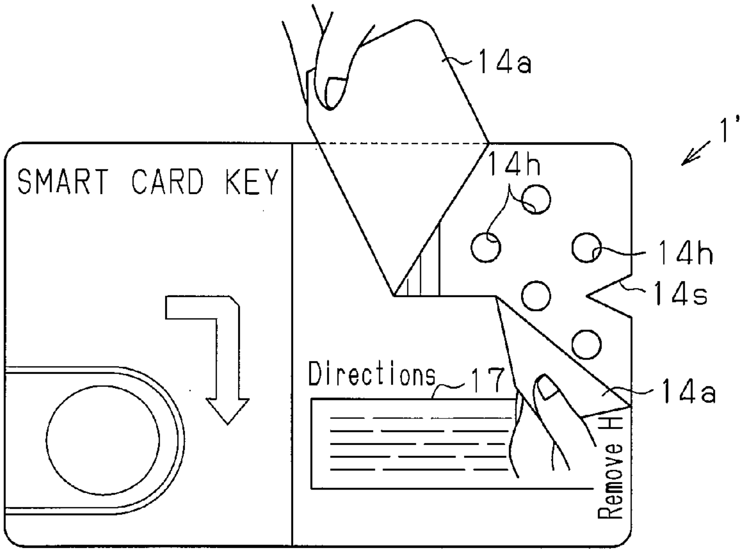
Figure 4C:
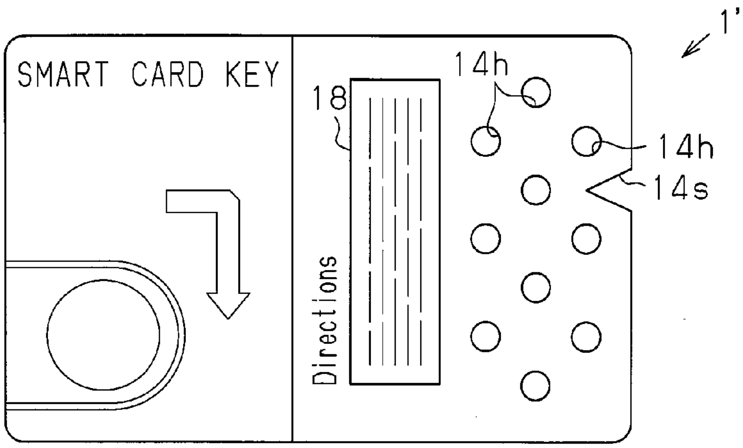

In the preferred embodiment, the concealment film 14*a* of the card-type electronic key 1 includes the non-adhesive region 14*t*, which facilitates removal of the concealment film 14*a* from the key card unit 14. FIGS. 4(*a*) to 4(*c*) show a first modification in which an electronic key 1' includes a triangular notch 14*s* formed in the peripheral portion of the key card unit 14 in lieu of the non-adhesive region 14*t*. The user of the vehicle 20 puts his or her fingers into the notch 14*s* to hold the peripheral portion of the concealment film 14*a* and tears the concealment film 14*a* from the inner end of the notch 14*s* (FIG. 4(*b*)). As shown in FIG. 4(*c*), this easily removes the concealment film 14*a* from the key card unit 14. Instead of the notch 14*s*, a perforation may be formed in a corner of the key card unit 14 so that the corner can be torn when bent. In this case, the concealment film 14*a* is easily removed by tearing the corner along the perforation away from the key card unit 14.

Figure 5A:
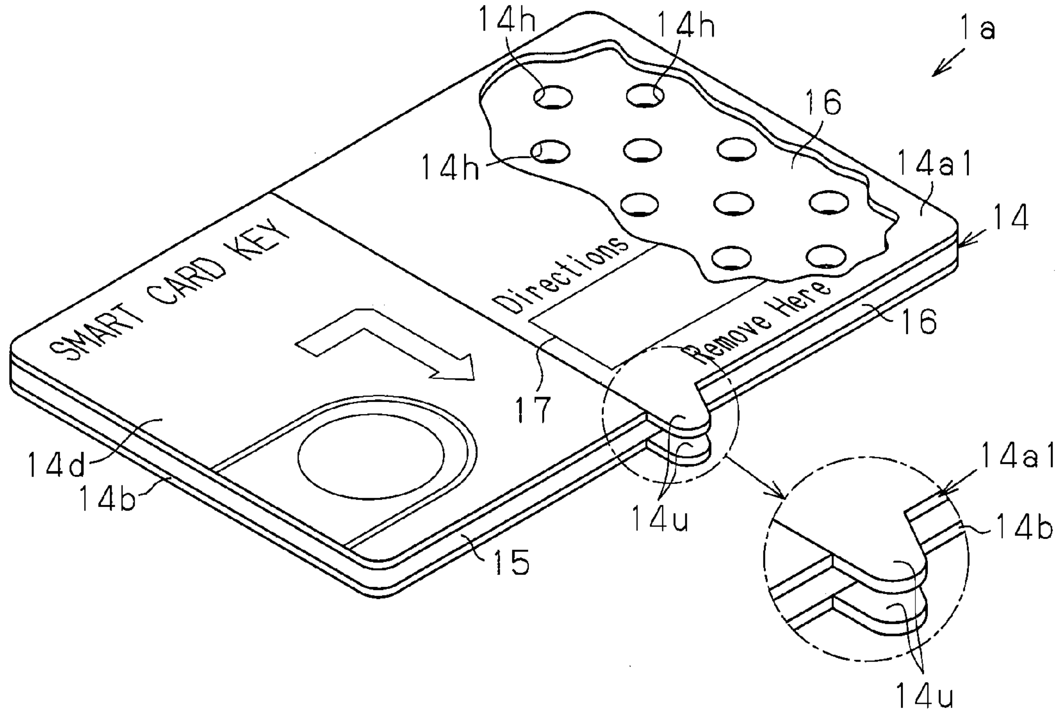
FIG. 5(*a*) is a perspective view showing a second modification of the electronic key.
Figure 5B:
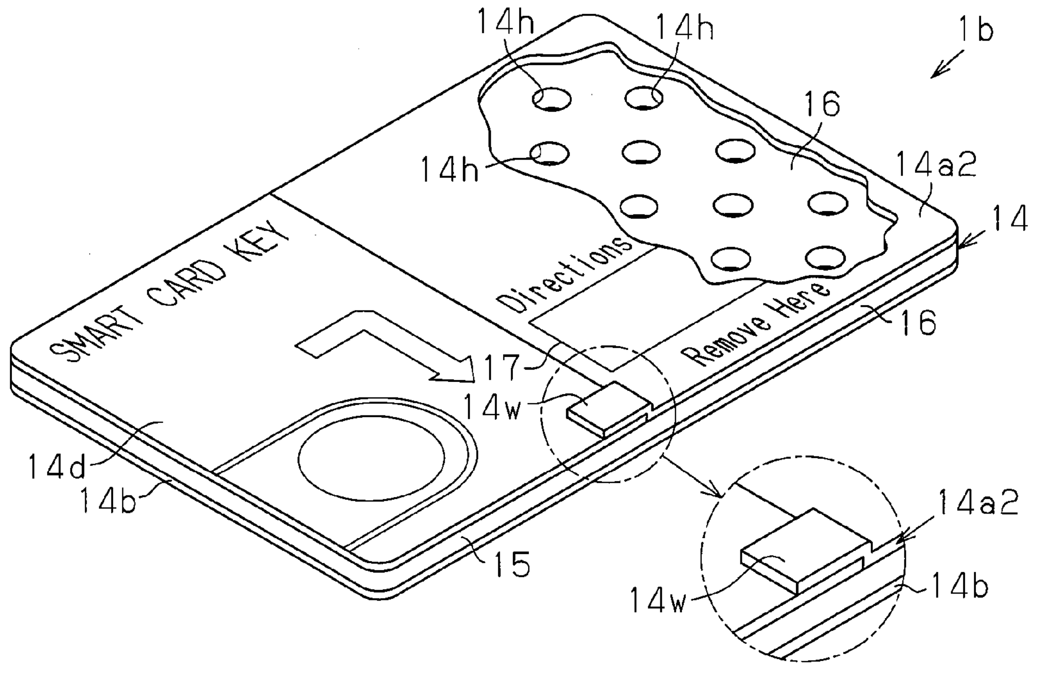

In the preferred embodiment, the concealment film 14*a* of the card-type electronic key 1 includes the non-adhesive region 14*t*, which eases removal of the concealment film 14*a* from the key card unit 14. FIG. 5(*a*) shows a second modification in which a card-type electronic key 1*a* includes tabs 14*u* formed on a concealment film 14*a*1 and a protection film 14*b*. The user of the vehicle 20 may easily remove the concealment film 14*a*1 from the key card unit 14 by pulling the tab 14*u* formed on a concealment film 14*a*1 with his or her fingers. A tab 14*u* can be formed only on the concealment film 14*a*1. FIG. 5(*b*) shows a third modification in which a card-type electronic key 1*b* includes a strip 14*w* extending from a concealment film 14*a*2 with the strip overlapping the concealment film 14*a*2. The user of the vehicle 20 can easily remove the concealment film 14*a*2 from the key card unit 14 by holding the strip 14*w* with his or her fingers.

In the preferred embodiment, once the concealment film 14*a* is removed from the key card unit 14, the adhesive capability of the key card unit 14 is such that it cannot be adhered again to the key card unit 14. This enables unauthorized removal of the concealment film 14*a* (unauthorized usage history of the key card unit 14) to be checked. In another example, when the concealment film 14*a* is removed from the key card unit 14, removal traces are left on the key card unit 14. Such a structure may be realized by forming the concealment film 14*a* from a material of which brittleness is adjusted. Examples of such a material having adjusted brittleness include, for example, a material in which inorganic powder is mixed in vinyl chloride.

Figure 6A:
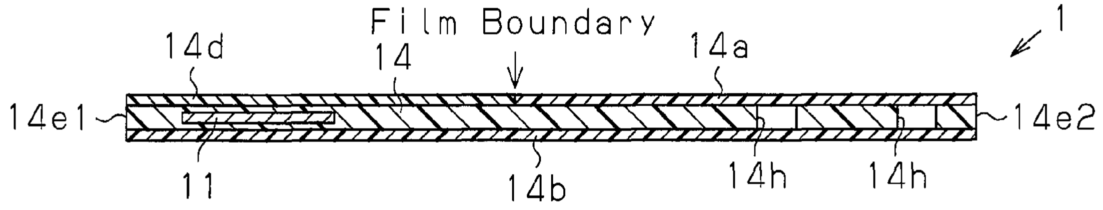
FIG. 6(*a*) is a cross-sectional view showing the card-type key of FIG. 2.
Figure 6B:
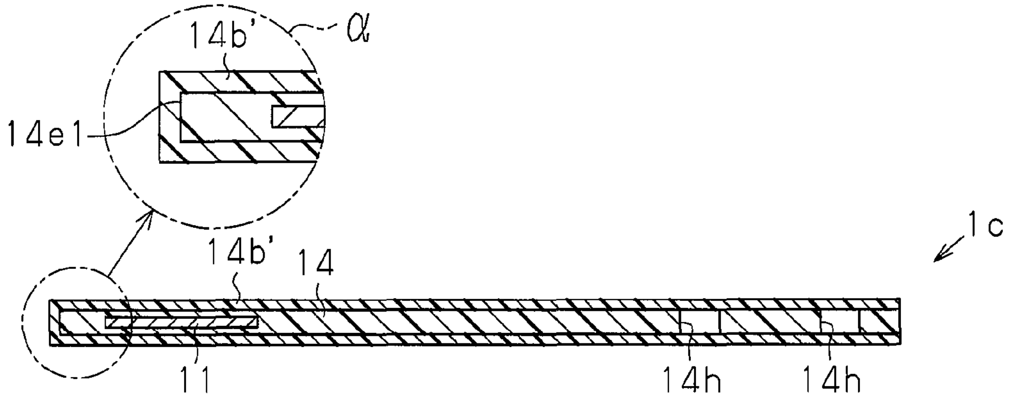
Figure 6C:
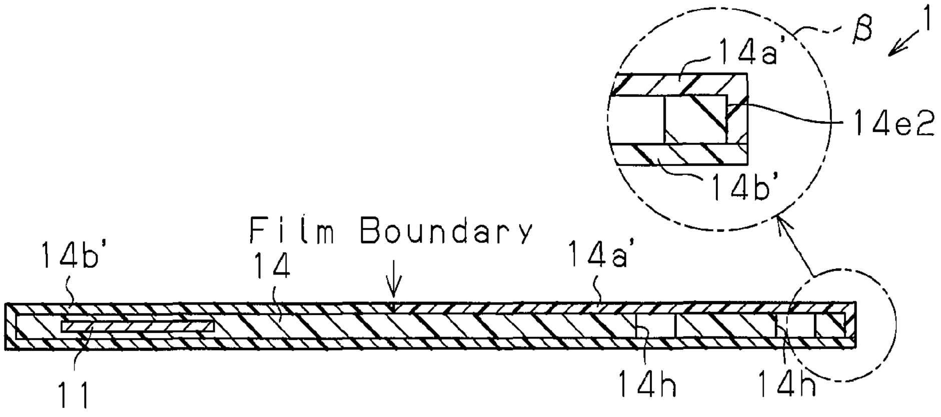

Referring to FIG. 6(*a*), the card-type electronic key 1 includes three films (i.e., the concealment film 14*a*, the coating film 14*d*, and the protection film 14*b*), and the key card unit 14 has two exposed lateral end surfaces 14*e*1 and 14*e*2. In the preferred embodiment, a plurality of discrete films are applied to the front and rear of the key card unit 14. This enables the four corners of the card-type electronic key 1 to have aesthetic curves when finished. FIG. 6(*b*) shows a fourth modification in which a card-type electronic key 1*c* includes only a single sheet of concealment film 14*b*' The concealment film 14*b*' covers the front of the key card unit 14, the lateral end surface 14*e*1 (the end surface at the side in which the electronic key computer 11 is arranged) of the key card unit 14, and the rear of the key card unit 14. The concealment film 14*b*' entirely covers the second card region 16 including the holes 14*h*. At least a portion of the concealment film 14*b*' that covers the second card region 16 can be removable from the second card region 16. FIG. 6(*c*) shows a fifth modification in which a card-type electronic key 1*d* includes two sheets of films (i.e., a concealment film 14*a*' and a protection film 14*b*' covering the lateral end surfaces 14*e*1 and 14*e*2). The concealment film 14*a*' differs from the concealment film 14*a* of the preferred embodiment in that it covers the end surface 14*e*2 in addition to the second card region 16. Further, the protection film 14*b*' differs from the protection film 14*b* of the preferred embodiment in that it covers the end surface 14*e*1 and the rear of the key card unit 14 in addition to the first card region 15. The concealment film 14*a*' entirely covers the second card region 16 including the holes 14*h*. At least a portion of the concealment film 14*a*' that covers the second card region 16 can be removable from the second card region 16.

Figure 7A:
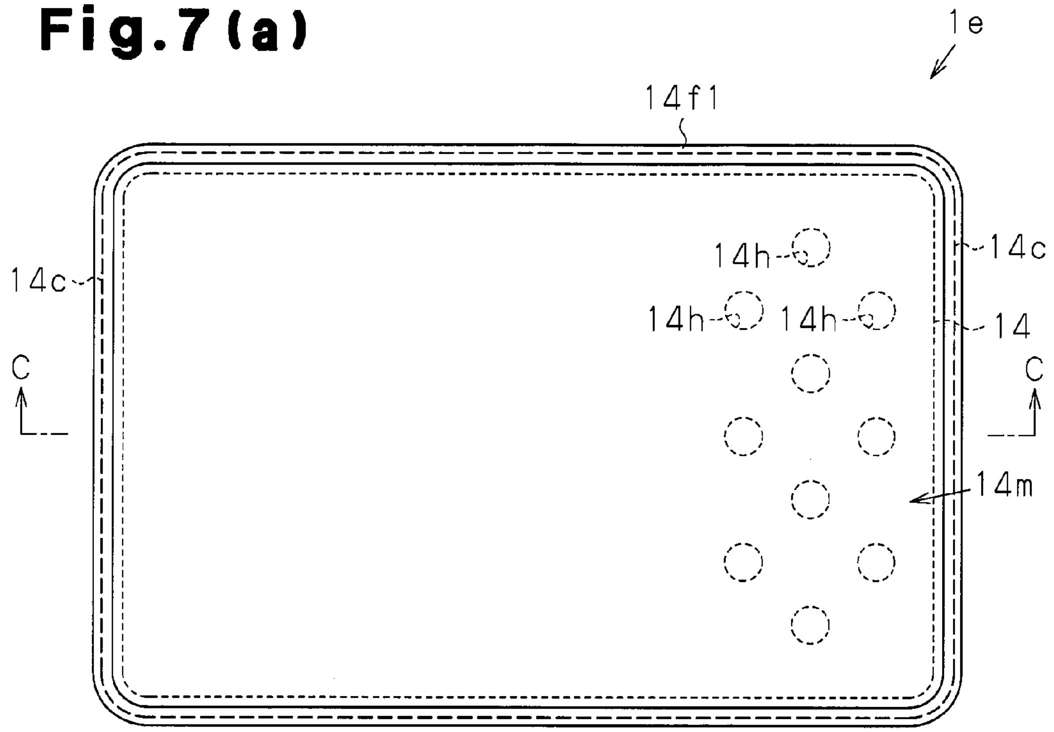
FIG. 7(*a*) is a plan view showing a sixth modification of the card-type electronic key.
Figure 7B:
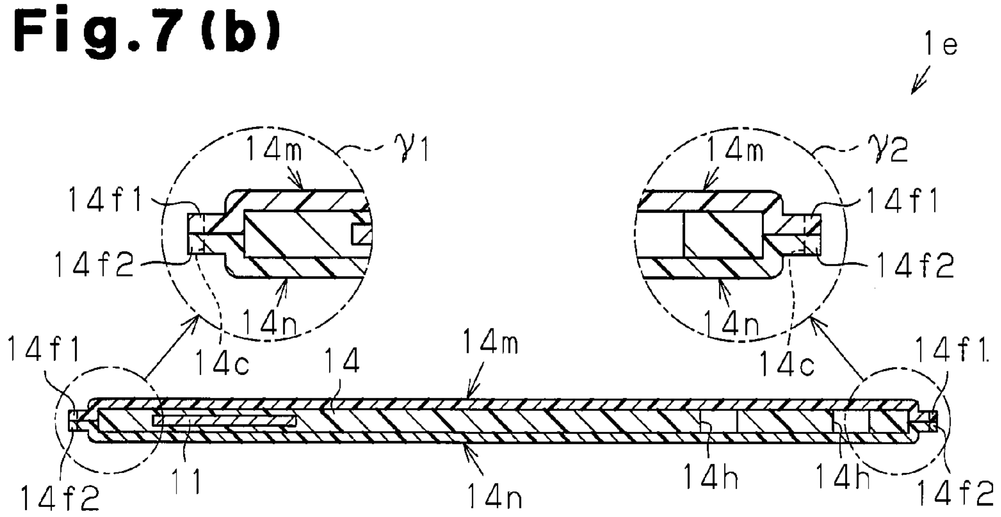
Figure 8:
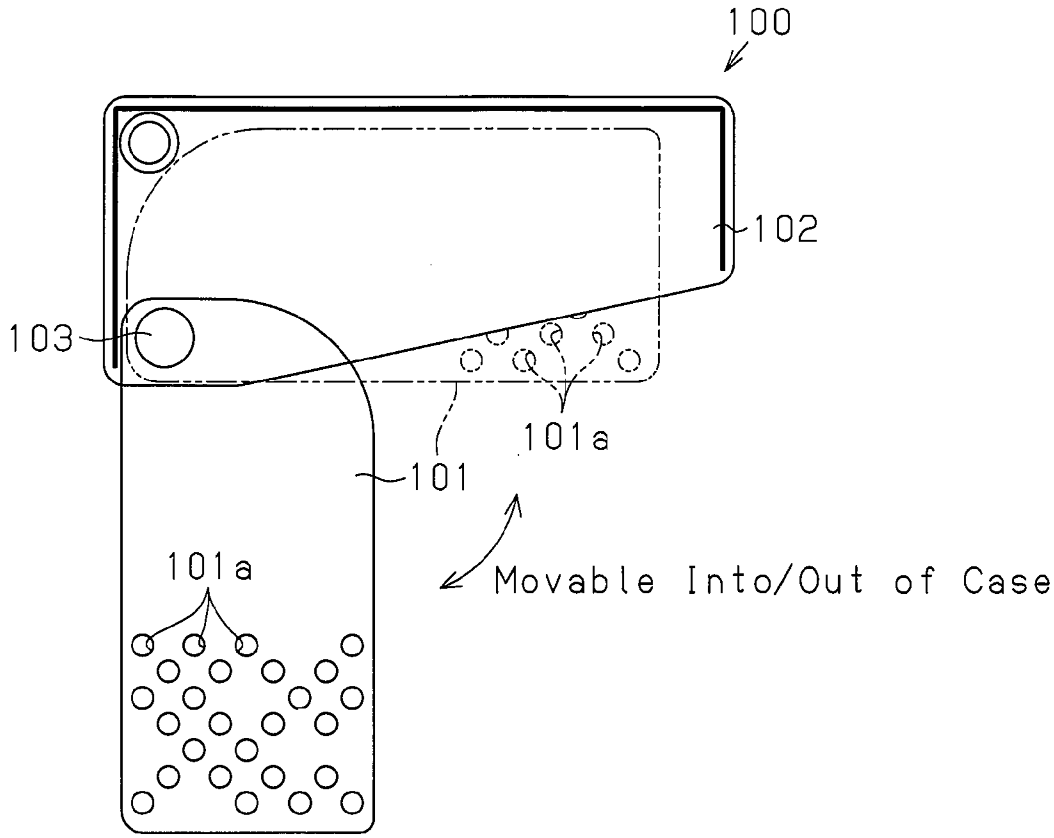
Fig.8(Prior Art)
FIG. 8 is a plan view showing a card key of the prior art.

FIGS. 7(*a*) and 7(*b*) show a sixth modification in which a card-type electronic key 1*e* includes two films (i.e., a concealment film 14*m* and a protection film 14*n*) to cover the entire front surface and entire rear surface of the key card unit 14 in lieu of the three films (i.e., the concealment film 14*a*, the coating film 14*d*, and the protection film 14*b*) used in the preferred embodiment. The two films 14*m* and 14*n* are identical to each other in shape and are slightly larger than the key card unit 14. The key card unit 14 is arranged between the two films 14*m* and 14*n*, and the peripheral portions of the concealment film 14*m* and protection film 14*n* are bonded together to completely enclose the key card unit 14 in the two films 14*m* and 14*n*. A perforation 14*c*, which is tetragonal and looped, may be formed in bonding regions 14*f*1 and 14*f*2, which are formed in the peripheral portions of the concealment film 14*m* and protection film 14*n* (refer to FIG. 7(*a*)). The perforation 14*c* allows the peripheral portions of the two films 14*m* and 14*n* to be easily torn with the fingers and facilitates the removal of the key card unit 14 when an abnormality or emergency occurs. At least a portion of the concealment film 14*m* that covers the second card region 16 can be removable from the second card region 16.

In the preferred embodiment, the verification code pattern of the key card unit 14 is formed by the through holes 14*h* of the key card unit 14, which functions as an emergency mechanical key. However, the verification code pattern may also be formed by a plurality of recesses (pits). Alternatively, the verification code pattern may be formed by ridges and valleys, by projections, or by a combination of ridges, valleys, and projections.

In addition to the vehicle 20 (four-wheel automobile), the subject to which the card-type electronic key 1 is applied may be another type of a mobile body, such as a two-wheel automobile, or real estate, such as a house.

In the preferred embodiment, the concealment film 14*a* is formed from a non-conductive resin material so as not to interfere with the wireless communication performed by the communication circuit unit 13. However, the present invention is not limited in such a manner. For example, as long as the loop antenna 12*a* can be adhered to the key card unit 14 without being electromagnetically shielded so that the wireless communication of the communication circuit unit 13 is prevented from being interfered, the concealment film 14*a* may be formed by a metal-deposited film such as an aluminum film.

In the preferred embodiment, the key card unit 14 includes the tetragonal first card region 15, which retains the communication circuit unit 13 (the electronic key computer 11 and the loop antenna 12*a*), and the tetragonal second card region 16, which includes the through holes 14*h*. Further, the card regions 15 and 16 are formed integrally with each other from the same resin material. However, the present invention is not limited in such a manner. For example, in the card-type electronic key 1, the tetragonal first card region 15, which retains the communication circuit 13, may be formed from a non-conductive resin material so as not to interfere with the wireless communication performed by the communication circuit unit 13. Further, the tetragonal second card region 16, which includes the through holes 14*h*, may be formed from a metal material, such as a chromium alloy, to increase rigidity, and the parts including the card regions 15 and 16 may be bonded together.

In the preferred embodiment, the concealment film 14*a* and the key card unit 14 are adhered together by an acrylic or solvent acrylic adhesive agent. However, the present invention is not limited in such a manner. It is only necessary that the concealment film 14*a* have a weak adhesive capability so that once the concealment film 14*a* is removed from the key card unit 14, it cannot be adhered again to the key card unit 14. For example, the rear surface of the concealment film 14*a* may undergo a heat treatment or the like so that the concealment film 14*a* becomes adhesive.

In the preferred embodiment, the concealment film and the key card unit each include an aesthetic surface. However, the present invention is not limited in such a manner. For example, only one of the concealment film and key card unit may include an aesthetic surface.

The present examples and embodiments are to be considered as illustrative and not restrictive, and the invention is not to be limited to the details given herein, but may be modified within the scope and equivalence of the appended claims.

What is claimed is:

1. A card-type electronic key provided with an emergency mechanical key, for use with a communication controller arranged in a subject remote from the card-type electronic key, the card-type electronic key comprising:

first and second card regions forming a planar card body;

a communication circuit unit embedded in the first card region, including an electronic key transceiver circuit which transmits a wireless signal including an authentication code and which provides backup power for the card-type electronic key, in which the communication circuit unit is allowed to control an external device arranged on the subject when the communication controller receiving the wireless signal determines that the verification code is authentic;

a verification code pattern in the second card region, formed by a plurality of through holes or a plurality of recesses extending in a thickness-wise direction of the second card region; and a concealment film which is removably adhered only to the second card region and which conceals the plurality of through holes or the plurality of recesses so that the through holes or recesses cannot be seen, wherein after the concealment film is removed from the second card region, the second card region functions as a key blade of the emergency mechanical key while the first card region functions as a key head of the emergency mechanical key.

2. The card-type electronic key according to claim 1, wherein: the concealment film includes a non-adhesive region which eases removal of the concealment film from the key card unit.

3. The card-type electronic key according to claim 2, wherein: the second card region includes corners; and the non-adhesive region is defined by a corner of the concealment film arranged at a location separated from the corners of the second card region.

4. The card-type electronic key according to claim 1, wherein the concealment seal has an adhesive capability set so that once the concealment film is removed from the key card unit, the concealment film cannot be adhered to the key card unit again.

5. The card-type electronic key according to claim 1, wherein: the concealment film includes an outer surface on which a primary aesthetic surface is formable by printing a character, a symbol, a line, or a graphical design; and the key card unit includes an outer surface on which a secondary aesthetic surface is formable by printing a character, a symbol, a line, or a graphical design.

6. The card-type electronic key according to claim 1, wherein the key card unit includes a notch which eases removal of the concealment film from the key card unit.

7. The card-type electronic key according to claim 1, wherein the concealment film is formed from a material having a brittleness that is adjusted to leave a removal trace when the concealment seal is removed from the key card unit.

8. The card-type electronic key according to claim 1, wherein the concealment film is a non-conductive body.

9. A card-type electronic key provided with an emergency mechanical key for use with a communication controller arranged in a subject remote from the card-type electronic key, the card-type electronic key comprising:

first and second card regions forming a planar card, wherein the first card region includes a communication circuit unit which transmits a wireless signal including an authentication code, in which the communication circuit unit includes an electronic key-transceiver circuit which provides backup power for the card-type electronic key and in which the communication circuit unit is allowed to control an external device arranged on the subject when the communication controller receiving the wireless signal determines that the verification code is authentic;

the second card region includes a mechanical, unpowered key card surface including a verification code pattern formed by a plurality of through holes or a plurality of recesses extending in a thickness-wise direction of the second card region; and a concealment film which is removably adhered only to the mechanical card key surface of the second card region and which conceals the plurality of through holes or the plurality of recesses of the verification code pattern so that the through holes or recesses cannot be seen, wherein after the concealment film is removed from the second card region, the second card region functions as a key blade of the emergency mechanical key while the first card region functions as a key head of the emergency mechanical key.

10. A card-type electronic key, comprising:

a first card region including a communication circuit unit which wirelessly transmits an ID code signal;

a second card region including a surface flush with an outer surface of the first card region, the surface of the second card region including a verification code pattern formed by a plurality of through holes or a plurality of recesses extending in a thickness-wise direction of the second card region, the first and second card regions forming a planar card body; and a concealment film removably adhered only to the second card region to conceal the verification code pattern, wherein after the concealment film is removed from the second card region, the second card region functions as a key blade of an emergency mechanical key while the first card region functions as a key head of the emergency mechanical key.

11. The card-type electronic key according to claim 10, further comprising:

a coating film adhered to the first card region to cover the communication circuit unit, wherein the concealment film is flush with the coating film.

* * * * *